US012710142B2

(12) United States Patent
Lancaster

(10) Patent No.: US 12,710,142 B2
(45) **Date of Patent: *Aug. 18, 2026**

(54) FUEL OIL ANTI-SIPHONING TOOL

(71) Applicant: John Lancaster, Saco, ME (US)

(72) Inventor: John Lancaster, Saco, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/971,192

(22) Filed: Dec. 6, 2024

(65) Prior Publication Data

US 2025/0102121 A1 Mar. 27, 2025

Related U.S. Application Data

(63) Continuation of application No. 18/167,162, filed on Feb. 10, 2023, now Pat. No. 12,209,713.

(60) Provisional application No. 63/393,301, filed on Jul. 29, 2022.

(51) Int. Cl.
*B60K 15/04* (2006.01)
*F17C 13/08* (2006.01)
*F17D 5/02* (2006.01)

(52) U.S. Cl.
CPC ............ *F17D 5/02* (2013.01); *B60K 15/0403* (2013.01); *F17C 13/08* (2013.01); *F17C 2221/032* (2013.01); *F17C 2260/028* (2013.01); *F17C 2270/0134* (2013.01)

(58) Field of Classification Search
CPC ........... F17C 2260/028; B60K 15/0403; F16L 15/007
USPC ........................................................ 220/86.3
See application file for complete search history.

(56) References Cited

U.S. PATENT DOCUMENTS

| | | | | | |
|---|---|---|---|---|---|
| 1,922,930 | A * | 8/1933 | Darms | B60K 15/0403 | 220/86.3 |
| 2,371,241 | A * | 3/1945 | Jaffa | B60K 15/0403 | 220/86.3 |
| 2,769,649 | A * | 11/1956 | Scully | B60K 15/04 | 277/622 |
| 3,016,162 | A * | 1/1962 | Cioffi | B60K 15/0403 | 220/86.3 |
| 3,951,297 | A * | 4/1976 | Martin | B60K 15/0403 | 220/86.3 |
| 4,630,748 | A * | 12/1986 | Keller | B60K 15/0403 | 220/86.3 |
| 12,209,713 | B2 * | 1/2025 | Lancaster | F17D 5/02 | |
| 2014/0027451 | A1 * | 1/2014 | Kaneko | B60K 15/0403 | 220/86.2 |
| 2015/0202957 | A1 * | 7/2015 | Kneisley | B60K 15/0403 | 220/86.3 |

* cited by examiner

*Primary Examiner* — Kevin F Murphy
(74) *Attorney, Agent, or Firm* — Brennan, Manna & Diamond, LLC

(57) ABSTRACT

The present invention relates to a fuel oil theft prevention tool configured to prevent theft or siphoning of fuel oil from a fuel tank. The tool is compact and lightweight and includes a metal female×female reduced coupling, a heavy-duty metal screen having a plurality of holes disposed therein, the screen is positioned inside the reduced coupling and is secured/biased and held tight by a torsional spring, a male×female hex bushing having a hexagonal head is positioned inside the reduced coupling over the screen for further securing of the screen. The tool is positioned between the fuel delivery pipe and the supply pipe and is configured to allow flow of fuel oil in only one direction.

12 Claims, 4 Drawing Sheets

FUEL OIL ANTI-SIPHONING TOOL

CROSS-REFERENCE TO RELATED APPLICATION

The present application is a continuation claims priority to, and the benefit of, U.S. patent application Ser. No. 18/167,162, which was filed on Feb. 10, 2023, and claims priority to, and the benefit of, U.S. Provisional Application No. 63/393,301, which was filed on Jul. 29, 2022, both of which are incorporated herein by reference in their entirety.

FIELD OF THE INVENTION

The present invention relates generally to the field of fuel theft prevention devices. More specifically, the present invention relates to a novel fuel oil anti-siphoning tool for preventing theft of fuel oil from a fuel tank. The tool includes a screen having a plurality of holes and the screen is positioned inside a reduced coupling. The tool is fastened using a hexagonal head of a hex bushing and one end of the reduced coupling. Accordingly, the present disclosure makes specific reference thereto. Nonetheless, it is to be appreciated that aspects of the present invention are also equally applicable to other like applications, devices, and methods of manufacture.

BACKGROUND

By way of background, #2, or number 2, fuel oil is an untaxed fuel used by individuals for their boilers or furnaces to heat their homes. Many individuals refer to #2 fuel oil as “home heating oil” or “regular fuel oil” to help differentiate it from diesel fuel. Essentially, diesel fuel and #2 fuel oil are virtually the same fuel in terms of chemical composition and the main difference lies in the intended use. Number 2 fuel oil is a lightweight material that flows easily, spreads rapidly, and is easily dispersed. This fuel is neither volatile nor likely to form emulsions and is relatively non-persistent in the environment.

Number 2 fuel oil is a precious asset during the coldest months of the year. Without a full tank, individuals may find themselves in an uncomfortable or even dangerous situation. As a result, many individuals may resort to theft to obtain fuel oil for their use. Also, with increasing costs of all types of oils and fuels, individuals have a tendency and incentive to steal oil and fuel. Conventionally, to protect siphoning #2 fuel oil from storage tanks through the supply chain, individuals deploy and use ineffective means.

For preventing stealing of the fuel oil, individuals try to make fuel tank invisible from the street. A fence or a strategically placed bush is used for shrouding tank from anyone who may be cruising around and looking for targets. Many individuals use expensive alerts and monitors for preventing unauthorized access to the fuel tanks. Manually monitoring a tank closely for large drops is also performed by homeowners to indicate foul play and potential theft. However, it should be noted that all these methods and others such as building an enclosure for the fuel oil tank are not only ineffective, but require manual intervention and are expensive. In fact, the oil supply line and the tanks themselves do not provide any mechanism or accessory for stopping siphoning of fuel oil. Individuals desire an easy and an effective way of stopping the siphoning of fuel oil from a fuel tank.

Therefore, there exists a long-felt need in the art for a fuel oil siphoning prevention system that prevents theft of #2 fuel from a fuel tank. There is also a long-felt need in the art for a #2 fuel siphoning prevention tool that eliminates chances of theft of fuel from the fuel tank and supply line. Additionally, there is a long-felt need in the art for a novel #2 fuel theft prevention tool that eliminates use of expensive alerts, monitors, and/or hiding or covering the fuel tank from trespassers and thieves. Moreover, there is a long-felt need in the art for a fuel oil theft prevention tool that is installed in the supply line for preventing fuel oil from any type of theft. Further, there is a long-felt need in the art for a fuel oil siphoning prevention system that ensures that a siphon cannot be placed into the fuel tank. Finally, there is a long-felt need in the art for an improved #2 fuel oil anti-siphoning screen that maximizes protection against fuel theft and is simple, convenient, and easy to install.

The subject matter disclosed and claimed herein, in one embodiment thereof, comprises a #2 fuel oil theft prevention tool configured to prevent theft of fuel oil from a fuel tank. The tool is comprised of, for example, a malleable iron reducing coupling 2½"×2" female×female for accommodating a heavy-duty metal screen, the metal screen comprising, for example, a copper reducing coupling 2"×½" cop×cop, having a plurality of holes disposed therein, the screen is positioned inside the coupling and is covered inside the coupling using a 2½"×2" male×female hex bushing, wherein a spring is placed between the screen and the bushing for holding the screen tight and biasing the screen inside the coupling (i.e., reducing coupler). The tool is fastened by screwing hexagonal head of the hex bushing and a fitting end of the coupling between the delivery pipe and supply pipe. A reducing coupling is designed to accept pipes into either end. For example, a 15 mm to 10 mm reducing coupling accepts a 15 mm pipe into one end and 10 mm pipe into the other end.

In this manner, the #2 fuel oil theft prevention tool of the present invention accomplishes all of the forgoing objectives and provides users with a siphoning prevention screen capable of preventing theft of #2 fuel from a fuel tank. The tool is installed between supply line and delivery line and eliminates use of any monitoring and alerting tools. Further, a siphon cannot be placed into the fuel tank and therefore, eliminating chance of theft.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a #2 fuel oil theft prevention tool that can be placed between a delivery pipe and a supply pipe on a fuel tank. The tool is compact, lightweight and can be retrofitted or integrated. The tool is comprised of, for example, a malleable iron reducing coupling 2½"×2" female×female for accommodating a metal screen, the metal screen, for example, comprising a copper reducing coupling 2"×½" cop×cop, having a plurality of holes disposed therein, the screen is positioned inside the coupling and is covered inside the coupling using a 2½"×2" male×female hex bushing, wherein a spring is placed adjacent to the screen at one end and adjacent to a terminal end of a supply pipe at another end to retain the spring therebetween. The tool is fastened by screwing hexagonal head of the hex bushing and a fitting end of the coupling between the delivery pipe and supply pipe.

The subject matter disclosed and claimed herein, in one embodiment thereof, comprises a mechanical device for preventing siphoning of fuel oil. The device is configured to be positioned with the fuel tank in both commercial and residential premises and comprises a reduced coupling made of malleable iron having a first female end and a second female end, a hex bushing having male threads and female threads, a torsional spring, a BU FLSH ½"×¼" FTG×COP (i.e., flush bushing), a heavy duty screen having a plurality of holes disposed therein, the screen is positioned inside the reduced coupling, one end of the spring slides over the narrow end of the screen and rests against the screen body, the hex bushing is positioned over the screen and spring to sandwich the screen and spring between the hex bushing and the reduced coupling. The flush bushing can be, for example, soldered inside the ½" narrow end of the 2"×½" screen to narrow the opening (i.e., access) to ¼" so as to prohibit a siphoning tool from fitting through the screen narrow end.

In another aspect of the present invention, a method of using a fuel oil anti-siphoning tool is described. The method includes the steps of providing an anti-siphoning tool, the tool includes a screen having a plurality of holes disposed therein, a hex bushing, a reduced coupling, a spring and a BU FLSH ½"×¼" FTG×COP; fastening hexagonal head of the hex bushing to the supply pipe; fastening one end of the reduced coupling to the delivery pipe (i.e., line) such that the screen is positioned inside the reduced coupling and is fastened using the hex bushing and the spring.

In yet another embodiment, the #2 fuel oil theft prevention tool of the present invention is easily and efficiently manufactured, marketed and available to consumers in cost-effective manner and is easily installed and used by users.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
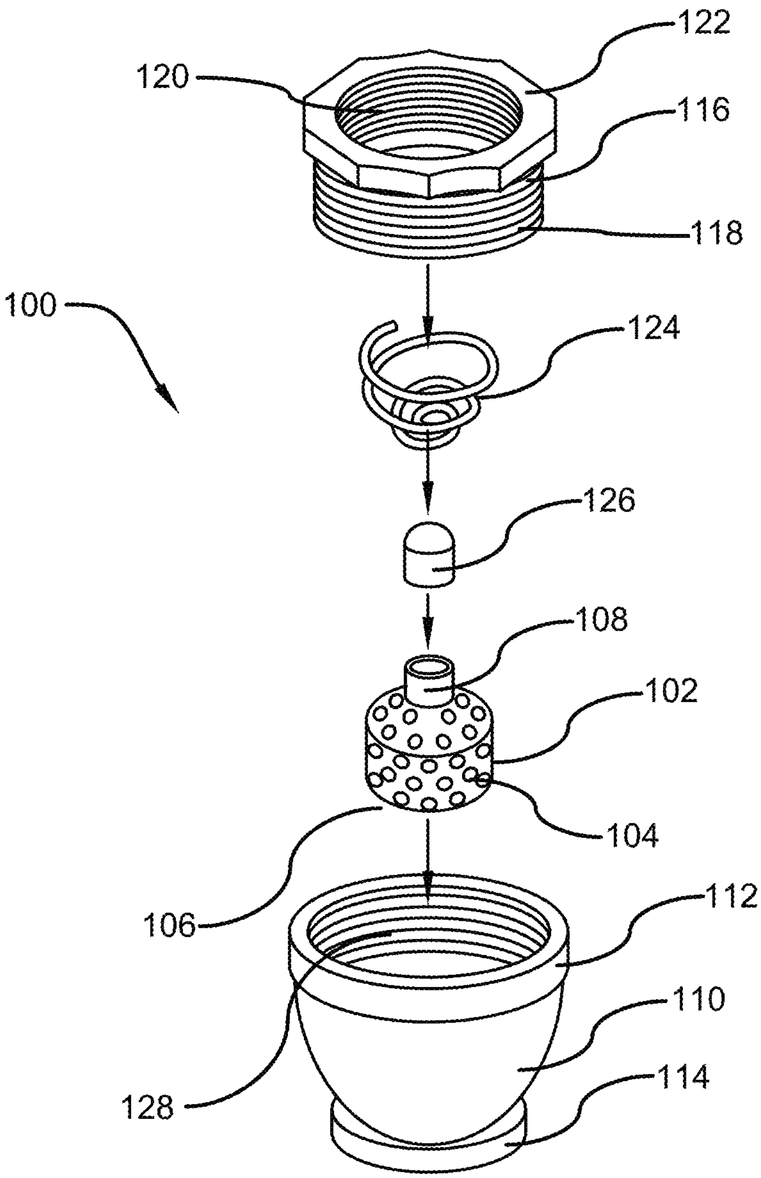
FIG. 1 illustrates an exploded view of one potential embodiment of a #2 fuel oil anti-siphoning tool of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a fuel oil siphoning prevention system that prevents theft of #2 fuel from a fuel tank. There is also a long-felt need in the art for a #2 fuel siphoning prevention tool that eliminates chances of theft of fuel from the fuel tank and supply line. Additionally, there is a long-felt need in the art for a novel #2 fuel theft prevention tool that eliminates use of expensive alerts and monitors, and/or hiding/covering the fuel tank from trespassers and thieves. Moreover, there is a long-felt need in the art for a fuel oil theft prevention tool that is installed in the supply line for preventing fuel oil from any type of theft. Further, there is a long-felt need in the art for a fuel oil siphoning prevention system that ensures that a siphon cannot be placed into the fuel tank. Finally, there is a long-felt need in the art for an improved #2 fuel oil anti-siphoning screen that maximizes protection against fuel theft and is simple, convenient, and easy to install.

The present invention, in one exemplary embodiment, is a mechanical tool for preventing siphoning of fuel oil. The device is configured to be positioned with the fuel tank in both commercial and residential premises and comprising a reduced coupling made of malleable iron having a first female end and a second female end, a hex bushing having male threads and female threads, a torsional spring, a BU FLSH ½"×¼" FTG×COP fastener, a heavy duty screen having a plurality of holes disposed therein, the screen is positioned inside the reduced coupling, the spring is positioned on the screen and fastened by the BU FLSH ½"×¼" FTG×COP, the hex bushing is positioned on the screen, the hex bushing is positioned around the spring to sandwich the spring and screen between a terminal end of the supply pipe and the reduced coupling.

Figure 3:
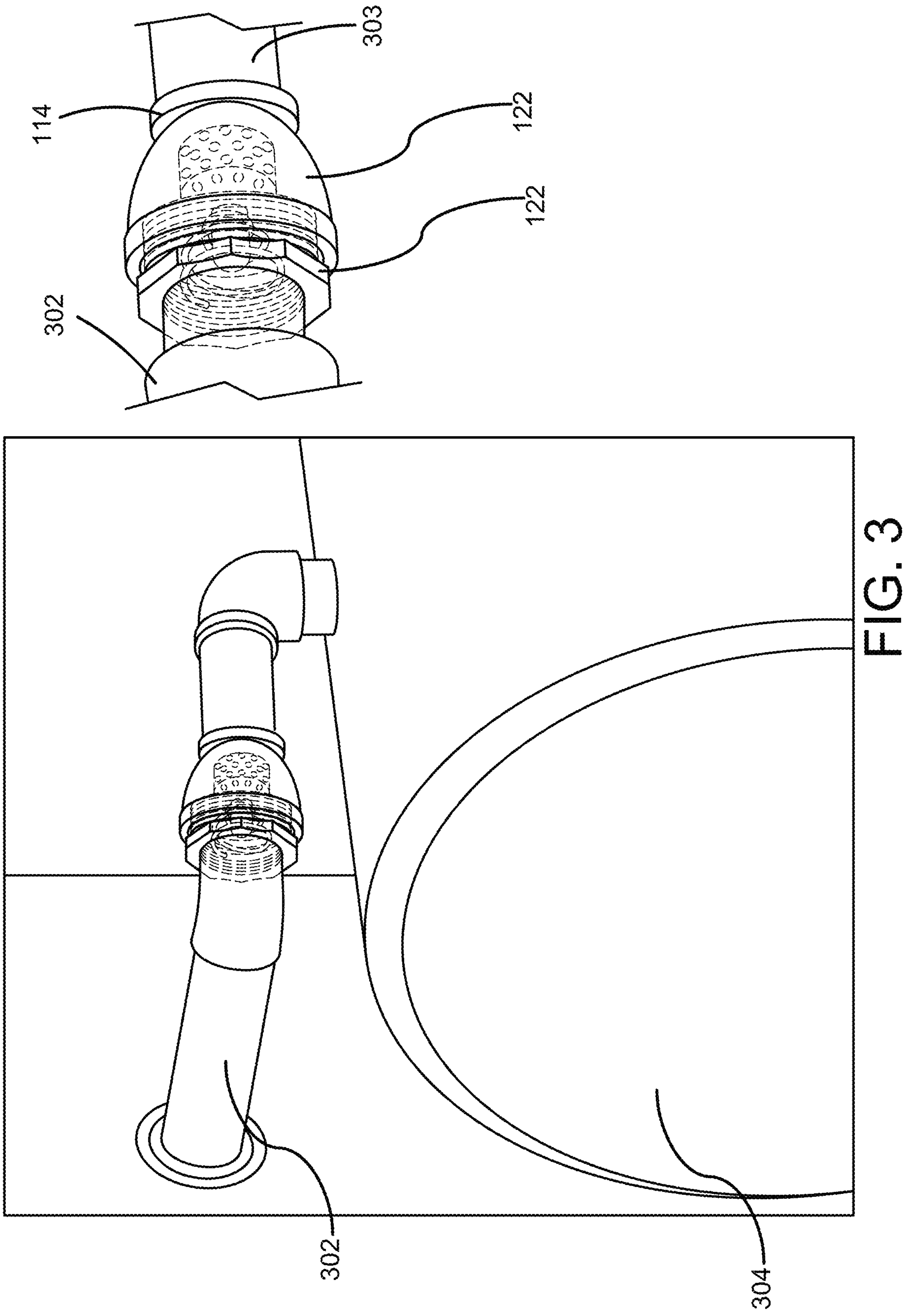
FIG. 3 illustrates a perspective view showing the anti-siphoning tool installed in a fuel oil supply line for preventing oil siphoning in accordance with the disclosed architecture.

Referring initially to the drawings, FIG. 1 illustrates an exploded view of one potential embodiment of #2 fuel oil anti-siphoning tool of the present invention in accordance with the disclosed architecture. The #2 fuel oil anti-siphoning tool 100 of the present invention is designed as a theft prevention tool that can be placed between a delivery pipe 302 and a supply pipe 303 on a fuel tank as illustrated in FIG. 3. The tool 100 includes an anti-siphoning screen 102 made of a lightweight metal or an alloy such as stainless steel. The screen 102 has a plurality of holes 104 disposed thereon for allowing the flow of the oil from the narrow end 108 to the broad end 106 thereof.

The tool 100 uses a malleable iron reducing coupling 110 formed of 2½"×2" female×female. The coupling 110 is made from lead-free copper or malleable iron. The coupling 110 is ideal for low-pressure plumbing applications including air, water, oil, natural gas, propane, and steam. The fitting side 112 is a female side and has a nominal size pipe fitting diameter of 2½ in. The opposite fitting side 114 is also a female side and has a nominal size pipe fitting diameter of 2 inches. The maximum operating pressure of the reduced coupling 110 is 250 psi @ 120 Degrees F. and is compatible for use with any type of oil or fuel.

The screen 102 is configured to position between the 2½" by 2" female×female coupling 110 and a 2½"×2" male×female hex bushing 116. The screen 102 is positioned inside the reduced coupling 110 and then the hex bushing 116 is placed on the top of the screen 102 inside the reduced coupling 110. The hex bushing 116 has male National Pipe Taper (NPT) threads on one end 118 and the female NPT threads on the other end 120 for connecting pipes of different sizes. The hex bushing 116 is preferably made from stainless steel and can be used with air, water, oil, propane, natural gas, steam, and more. The head 122 is hexagonal for increased leverage and use with a wrench and the male threads 118 can also be threaded to the female threads 128 of the first fitting side 112 of the reduced coupling 110.

A support spring 124 is used for holding or biasing the screen 102 inside the reduced coupling 110 (i.e., reducing coupler). The spring 124 is preferably a torsional spring and is fastened using BU FLSH ½"×¼" FTG×COP fastener 126 (i.e., flush bushing). The spring 124 does not obstruct the flow of oil through the screen 102 and helps in tight attachment of the tool 100 in a supply line or pipe. It should be appreciated that the #2 fuel oil theft prevention tool is compact in size and can be fixed to any fuel oil supply line for preventing siphoning of the oil. Also, flow is maintained in one direction, thereby eliminating any fuel siphoning. The flush bushing 126 can be, for example, soldered inside the ½" narrow end of the 2"×½" screen 102 to narrow the opening (i.e., access) to ¼" so as to prohibit a siphoning tool from fitting through the screen narrow end 108.

The tool 100 can be retrofitted to any supply line of the fuel oil using a wrench or similar equipment by an operator. Further, the tool is durable, cost-effective and can be easily used with #2 fuel oil without periodic manual intervention.

Figure 2:
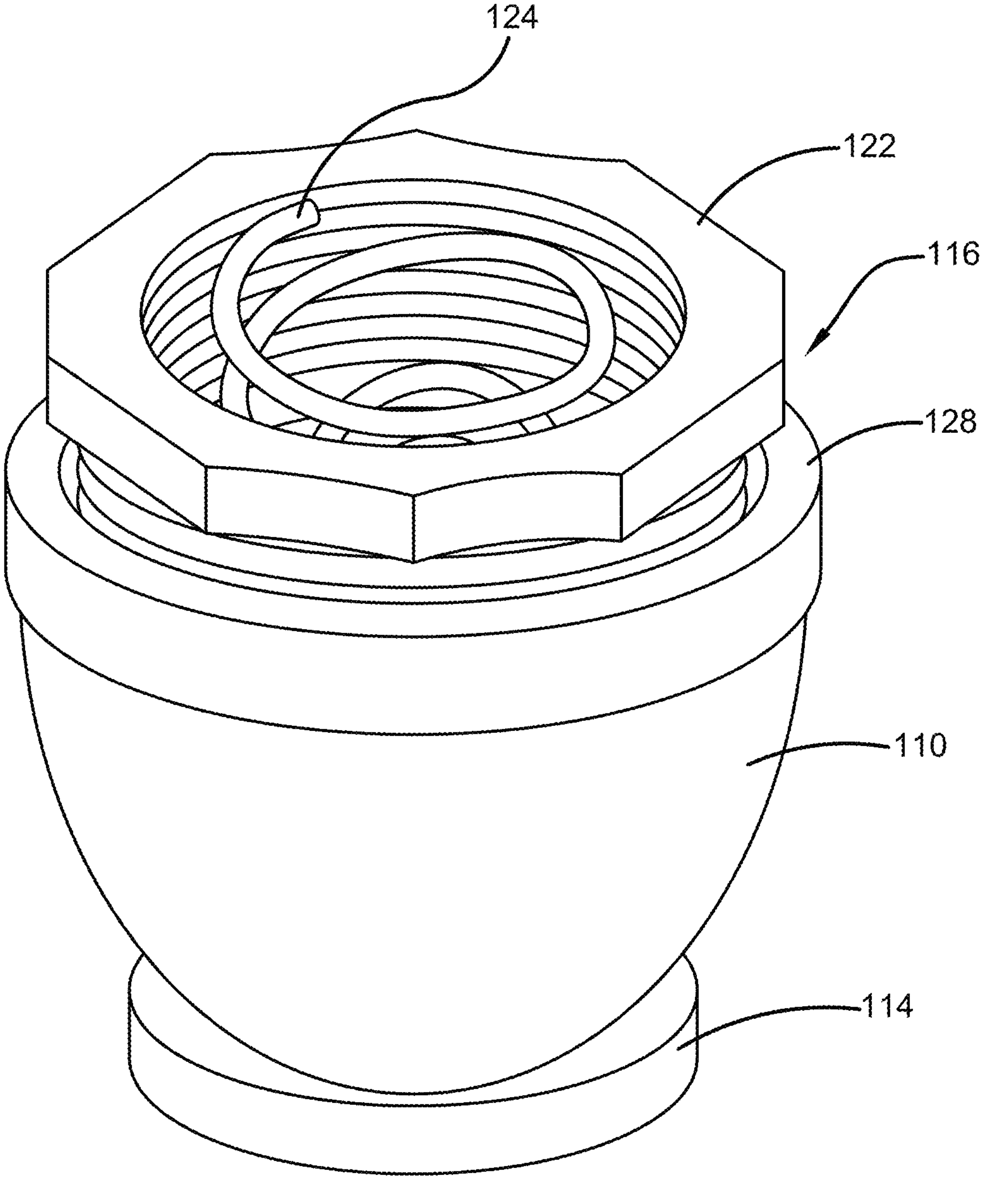
FIG. 2 illustrates a perspective view showing the fuel oil anti-siphoning tool of the present invention in accordance with the disclosed architecture.

FIG. 2 illustrates a perspective view showing the fuel oil anti-siphoning tool 100 of the present invention in accordance with the disclosed architecture. In use, the tool 100 is assembled with the screen 102 positioned inside the reduced coupling 110 and is held tight (i.e., biased) by the support spring 124. The hexagonal head 122 may be fastened to the supply pipe 303 carrying fuel oil and the bottom end 114 of the reduced coupling 110 may be fastened at the other end to the delivery pipe 302.

The hex bushing 116 is screwed inside the reduced coupling 110 with the male threads 118 of hex bushing 116 threaded to the female threads 128 of the first fitting side 112 of the reduced coupling 110. The spring 124 is positioned and fastened using the BU FLSH ½"×¼" FTG×COP fastener 126. In the preferred embodiment, the length of the tool 100 in an assembled state, as shown in FIG. 2, is about 4" such that the tool 100 can be easily positioned in hard-to-reach areas by an operator.

FIG. 3 illustrates a perspective view showing the anti-siphoning tool installed in a fuel oil supply line for preventing oil siphoning in accordance with the disclosed architecture. The tool 100 is positioned in the fuel oil supply line, for example between the delivery pipe 302 and the supply pipe 303 to prevent transmission of fuel back from the fuel tank 304. The tool 100 is secured to the supply line by fastening the hexagonal head 122 to the supply pipe 303 and by fastening the second fitting side 114 to the delivery pipe 302.

The tool 100 can be installed in any new supply line installation or can be retrofitted in any commercial or residential pipeline. Further, the tool 100 may come in different sizes and configuration to meet requirements of different fuel oil volume and pressure.

Figure 4:
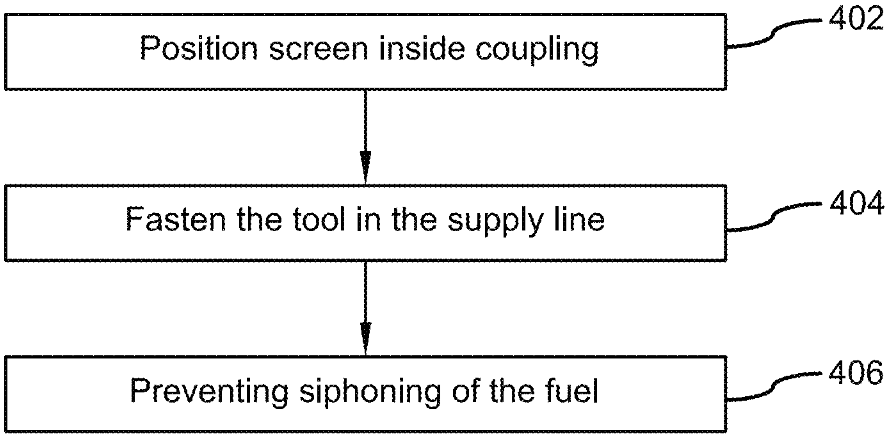
FIG. 4 illustrates a flow diagram depicting a process of using the fuel oil anti-siphoning tool of the present invention in accordance with the disclosed architecture.

FIG. 4 illustrates a flow diagram depicting a process of using the fuel oil anti-siphoning tool of the present invention in accordance with the disclosed architecture. Initially, the screen is positioned inside the reduced coupling and fastened, secured, or biased using the support spring (Step 402). Then, the tool is fastened using a wrench or similar equipment between the delivery pipe and the supply pipe (Step 404). Thereafter, the fuel oil is supplied from the connected fuel tank while preventing siphoning (Step 406).

Advantageously, the fuel oil anti-siphoning tool 100 can be used for preventing theft of #2 fuel oil from the fuel tank in a simple, convenient, and easy to install theft prevention system. Further, the tool 100 does not require any manual intervention and maintains flow of the fuel from the fuel tank. The #2 oil flows into the second end of the hex bushing 116 through the screen 102 and out of the second end 114 of the reduced coupling 110.

Certain terms are used throughout the following description and claims to refer to particular features or components. As one skilled in the art will appreciate, different persons may refer to the same feature or component by different names. This document does not intend to distinguish between components or features that differ in name, but not structure or function. As used herein "anti-siphoning tool", "fuel oil anti-siphoning tool", "#2 fuel oil anti-siphoning tool", "tool", "anti-theft device", and "#2 fuel oil theft prevention tool" are interchangeable and refer to the #2 fuel oil anti-siphoning tool 100 of the present invention.

Notwithstanding the forgoing, the #2 fuel oil anti-siphoning tool of the present invention can be of any suitable size and configuration as is known in the art without affecting the overall concept of the invention, provided that it accomplishes the above stated objectives. One of ordinary skill in the art will appreciate that the #2 fuel oil anti-siphoning tool 100 as shown in the FIGS. are for illustrative purposes only, and that many other sizes and shapes of the #2 fuel oil anti-siphoning tool 100 are well within the scope of the present disclosure. Although the dimensions of the #2 fuel oil anti-siphoning tool 100 are important design parameters for user convenience, the #2 fuel oil anti-siphoning tool 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fuel anti-siphoning tool comprising:

an anti-siphoning fuel tool having a reducing coupler, a screen, a spring, and a bushing;

wherein said fuel anti-siphoning tool mounted between a delivery pipe and a supply pipe of a fuel tank;

wherein said screen and said spring are retained between said reducing coupler at one end and said bushing at another end;

wherein said spring having a material selected from a lightweight metal;

wherein said screen having a broad end and a narrow end and a plurality of holes disposed therethrough for allowing a flow of fuel from said narrow end to said broad end; and further wherein said bushing having male National Pipe Taper (NPT) threads at a first end and female NPT threads at a second end for connecting pipes of different sizes.

2. The fuel anti-siphoning tool of claim 1, wherein said reducing coupler having a material selected from a copper or a malleable iron.

3. The fuel anti-siphoning tool of claim 1, wherein said reducing coupler having a female thread at a first end and a female thread at a second end.

4. The fuel anti-siphoning tool of claim 1, wherein said first end of said reducing coupler having a diameter of 2½ inches.

5. The fuel anti-siphoning tool of claim 4, wherein said second end of said reducing coupler having a diameter of 2 inches.

6. The fuel anti-siphoning tool of claim 1, wherein said fuel is #2 fuel oil.

7. The fuel anti-siphoning tool of claim 1, wherein said spring having a material of stainless steel.

8. The fuel anti-siphoning tool of claim 1, wherein said first end of said bushing having a diameter of 2½ inches.

9. The fuel anti-siphoning tool of claim 8, wherein said second end of said bushing having a diameter of 2 inches.

10. The fuel anti-siphoning tool of claim 1, wherein said screen is positioned inside of said reducing coupler.

11. The fuel anti-siphoning tool of claim 1, wherein said bushing is a hex head bushing having a material of stainless steel.

12. The fuel anti-siphoning tool of claim 1, wherein said spring is a torsional spring for holding said screen inside said reducing coupler.

* * * * *